US008102603B2

(12) United States Patent
Getman et al.

(10) Patent No.: US 8,102,603 B2
(45) Date of Patent: Jan. 24, 2012

(54) LENS HAVING EXTENDED DEPTH OF FOCUS, METHOD FOR DESIGNING THE SAME, AND OPTICAL SYSTEM HAVING THE SAME

(75) Inventors: Alexander Getman, Yongin-si (KR); Andrey Lukyanov, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 85 days.

(21) Appl. No.: 12/453,328

(22) Filed: May 7, 2009

(65) Prior Publication Data

US 2009/0279189 A1   Nov. 12, 2009

(30) Foreign Application Priority Data

May 9, 2008   (KR) .................. 10-2008-0043428

(51) Int. Cl.
G02B 3/00 (2006.01)
G02B 13/00 (2006.01)
(52) U.S. Cl. ...................................... 359/642; 359/724
(58) Field of Classification Search ............... 359/642, 359/724
See application file for complete search history.

(56) References Cited

U.S. PATENT DOCUMENTS

| 5,210,398 | A | * | 5/1993 | Metlitsky ................. 235/462.24 |
| 6,330,118 | B1 | | 12/2001 | Daschner et al. |
| 6,927,922 | B2 | | 8/2005 | George et al. |
| 2007/0017993 | A1 | | 1/2007 | Sander |
| 2010/0118419 | A1 | * | 5/2010 | Cho ................................ 359/724 |

FOREIGN PATENT DOCUMENTS

KR   10-2007-0045506   5/2007

* cited by examiner

Primary Examiner — Evelyn A. Lester
(74) Attorney, Agent, or Firm — Harness, Dickey & Pierce, P.L.C.

(57) ABSTRACT

The lens includes a plurality of lens layers, each lens layer being axi-symmetric and having an extended depth of focus to focus light in a corresponding section of a focal curve in the form of a straight line located on an optical axis. In the optical system, light is focused on an optical axis to obtain a clear image in a wide distance range between a camera and an object. The optical system has a point spread function that is simpler and more symmetric. That is, the optical system provides improved continuity of a lens surface and easiness and flexibility in optical designing.

21 Claims, 6 Drawing Sheets

LENS HAVING EXTENDED DEPTH OF FOCUS, METHOD FOR DESIGNING THE SAME, AND OPTICAL SYSTEM HAVING THE SAME

PRIORITY STATEMENT

This application claims priority under 35 U.S.C. §119 to Korean Patent Application No. 10-2008-0043428, filed on May 9, 2008, in the Korean Intellectual Property Office (KIPO), the entire contents of which are incorporated herein by reference.

BACKGROUND

1. Field of the Invention

Example embodiments relate to optical technology, and more particularly, to an axi-symmetric lens having an extended depth of focus, and an optical system having the axi-symmetric lens.

2. Description of the Related Art

In general, a depth of focus (DOF) is one of the major characteristics of an optical system defining a distance range between an object plane and a lens, or a distance range between a lens and an image plane, to obtain a clear image. The major factors determining the DOF include aperture size and aberration of various optical lenses.

A general optical system using thin lens approximation is inappropriate for use in a variety of industrial fields using laser material processing, lithography, or light projection and image processing. In these industrial fields, a demand for an optical system having a DOF improved to that of a general optical system has increased.

According to "Wave Front Coding" written by Dowksi et al., a solution for an optical system having an extended depth of focus (EDOF) is to insert a phase plate in an aperture stop of an optical system. Because the phase plate has a small divergence in light distribution at a focal point, asymmetrical distortion of a wave front is generated to increase the DOF.

Accordingly, because a point spread function (PSF) of an optical system has asymmetrical and important space dimensions, image post-processing to remove the dimensions is needed. Although the image post-processing may be solved based on the characteristic of a PSF profile that may be perpendicularly separated, the asymmetry of the PSF may reduce allowance of design errors in an EDOF system.

As another method of realizing the EDOF, a plurality of Fresnel lenses having different focal distances are multiplexed as a single optical element. The apertures of the Fresnel lenses are arranged on the entire surface and divided into independent portions. The portions are divided again into a plurality of sub-portions. Appropriate Fresnel lens portions are used to fill the sub-portions.

The uniform distribution of the portions and the sub-portions may generate undesired image duplication. Because the image duplication may be removed by randomizing the portions and sub-portions of the aperture division, a clear image may be obtained without the post-processing of an image. However, the optical system has problems with discontinuity, asymmetry, and randomization that may deteriorate the performance of the EDOF system.

As another method of realizing the EDOF, a lens that is symmetric, divided into a plurality of zones, and has a smooth surface is used as an aspherical lens. The focal distance of the lens continuously varies from a near distance to a far distance while the optical performance is similar in each zone. However, this structure is appropriate for the aspherical lens, but inappropriate for a portion exceeding the optical performance of an eye. An optical system having a improved performance may be obtained by eliminating the defects on the lens surface.

SUMMARY

Example embodiments provide a lens having an extended depth of focus that can at least one of: generate a clear image regardless of a distance from an object and has symmetry, simplify a point spread function, provide continuity of a lens surface, and easy design, as well as an optical system having the lens.

According to an example embodiment, there is provided a lens having an extended depth of focus that includes a plurality of lens layers. Each of the lens layers may be an axi-symmetric lens focusing light in a corresponding section of a plurality of sections of a focal curve in the form of a straight line located on an optical axis.

The lens having an extended depth of focus may include a plurality of first lens layers located outside a radius from an optical axis, and a plurality of second lens layers located within the radius from the optical axis. The plurality of first lens layers may focus light in a section from each of both ends of a focal curve in form of a straight line located on the optical axis to a focal distance. A light field formed by a corresponding one of the plurality of second lens layers may be coherently mixed with a light field formed by the first lens layers.

The plurality of first lens layers may include at least one first-type first lens layer that focuses light in a section from any one of both ends of the focal curve to a first focal distance, and at least one second-type first lens layer that focuses light in a section from the other one of both ends of the focal curve to a second focal distance.

The plurality of second lens layers may include at least one first-type second lens layer that forms a light field to be coherently mixed with the light field formed by the at least one first-type first lens layer, and at least one second-type second lens layer that forms a light field to be coherently mixed with the light field formed by the at least one second-type first lens layer.

The sections of the focal curve corresponding to the lens layers may be overlapped with one another. A thickness of each of the corresponding at least one lens layer of the plurality of lens layers may control a distribution of intensity of a light field of any one of the plurality of sections of the focal curve.

Instant focal lengths of the lens layers with respect to radii of the plurality of lens layers or by optical phase delays of the lens layers with respect to radii of the plurality of lens layers may be defined by a phase function of the lens having an extended depth of focus.

According to another example embodiment, there is provided an optical system that includes a lens including a plurality of lens layers, each lens layer being axi-symmetric and having an extended depth of focus to focus light in a corresponding section of a plurality of sections of a focal curve in the form of a straight line located on an optical axis, an image sensor configured to detect an image formed by the lens having an extended depth of focus, and an image processor configured to restore an image detected by the image sensor.

According to the other example embodiment, there is provided an method for designing an extended depth of focus lens that includes dividing the focal curve of the lens into a plurality of sections, focusing both ends of the focal curve using one or more first lens layers located outside a radius from an optical axis, focusing the focal curve using one or more second lens layers located within the radius from the optical axis, calculating the lens phase function, and manufacturing the lens. Wherein the plurality of first lens layers focus light in a section from each of both ends of a focal curve in the form of a straight line located on the optical axis to a focal distance, and the focusing of the one or more second lens layers generates a coherent mixing with the one or more first lens layers.

BRIEF DESCRIPTION OF THE DRAWINGS

Example embodiments will be more clearly understood from the following brief description taken in conjunction with the accompanying drawings.

FIG. 1 is a block diagram of an optical system according to an example embodiment;

FIG. 2 is a conceptual view for explaining a ray correspondence rule;

FIG. 3 is a conceptual view for explaining the ray correspondence rule of the EDOF lens of FIG. 1;

FIG. 4 is a conceptual view for explaining the focusing operation of the EDOF lens of FIG. 1;

FIG. 5 is a flowchart for explaining the design process of an EDOF lens, according to an example embodiment; and FIG. 6 is a graph showing a simulation result of an instant focal distance of the EDOF lens with respect to the lens layer, according to an example embodiment.

Figure 1:
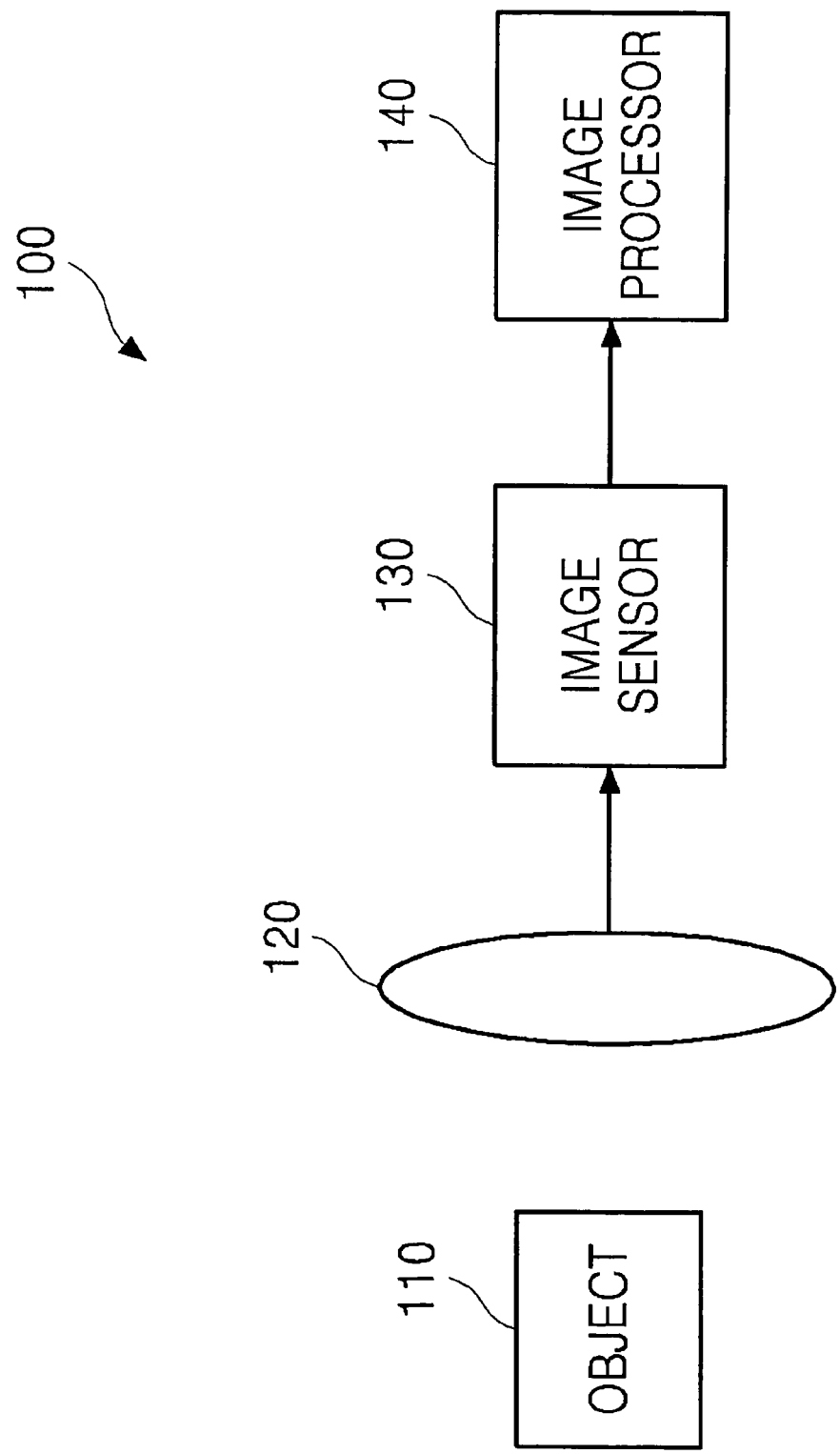
FIGS. 1-6 represent non-limiting, example embodiments as described herein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block diagram of an optical system 100 according to an example embodiment. Referring to FIG. 1, the optical system 100 includes a lens having an extended depth of focus (120; EDOF), an image sensor 130, and an image processor 140. The optical system 100 may be any of various camera modules or various photographing devices.

The EDOF lens 120 takes an image of an object 110. The image sensor 130 detects an image formed by the EDOF lens 120. The image sensor 130 may be a CMOS image sensor or a CCD. The image processor 140 may restore the image detected by the image sensor 130. The EDOF lens 120 has an axi-symmetric structure and may include a plurality of lens layers. Each of the lens layers may focus light with a corresponding section of a plurality of sections of a focal curve in the form of a straight line located on an optical axis.

The EDOF lens 120 is based on an optical element for focusing light on an optical axis, that is disclosed in an article published in Golub in 1981. The article widely covers an issue of design of an optical element, or a focusator, focusing light on a 3-D curve, or a focal curve.

In the designing of the EDOF lens 120 is to set a ray correspondence rule (RCR) is set between points on a focal curve and a point on an aperture of the EDOF lens 120. The RCR signifies that there is a set of points on an aperture of a lens, or a lens layer, that accurately focuses light on selected points of a focal curve with respect to all selected points on the focal curve.

The EDOF 120 may operate like a coherent superposition of lens layers, each of which may operate as a lens focusing light on different points. The focal distance of each lens layer on each point is referred to as an instant focal distance.

The coherent superposition signifies that the lens layers are arranged such that a light field formed by a lens layer may generate constructive interference with respect to a light field formed by another lens layer. The constructive interference of a light field by the lens layers according to the coherent superposition is referred to coherent mixing.

When coherent mixing is generated at a particular position, the intensity of a light field at the particular position may be further increased. Accordingly, the EDOF lens 120 may provide a clearer image at the particular position.

Figure 2:
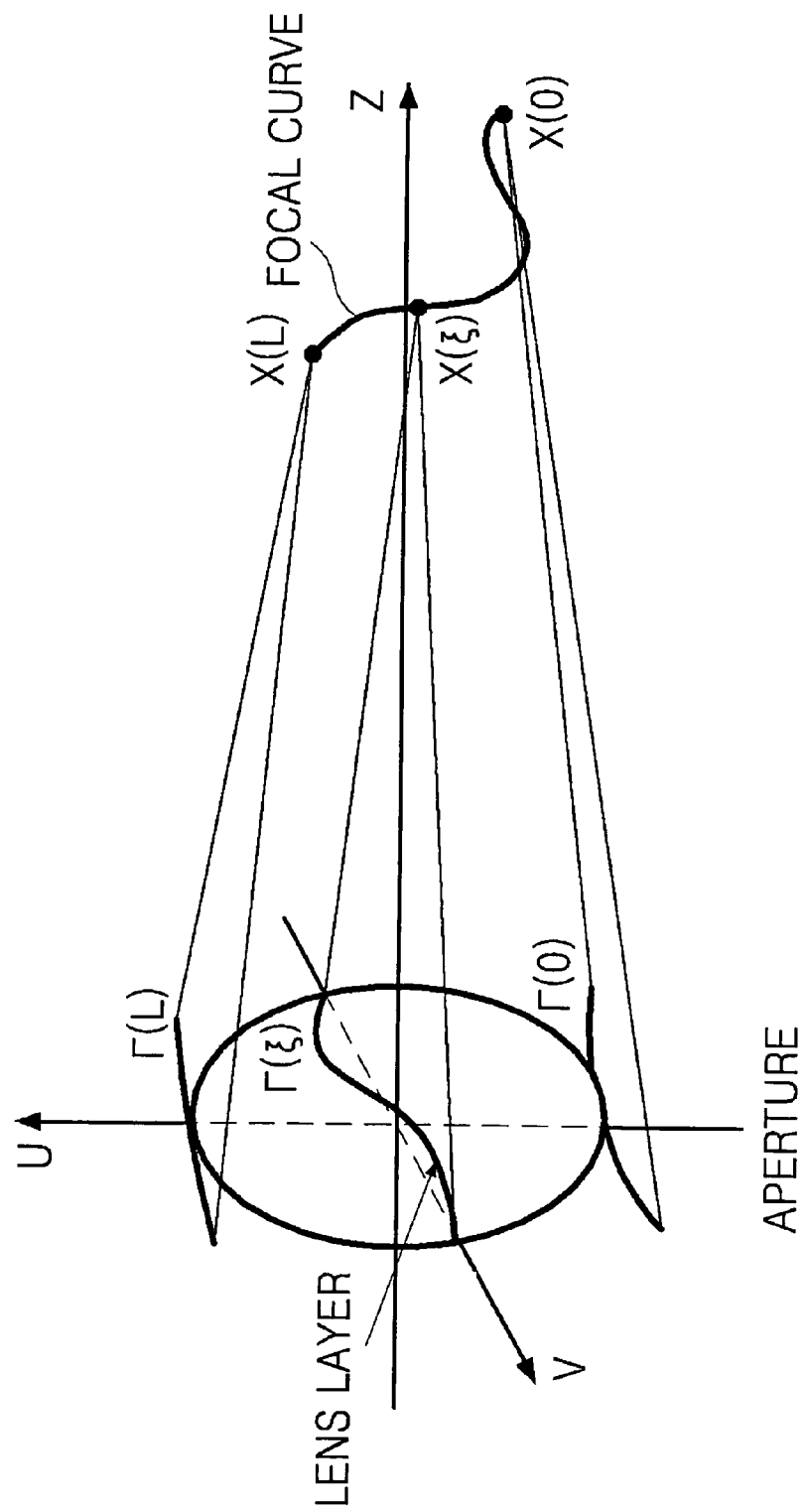

FIG. 2 is a conceptual view for explaining the RCR. Referring to FIG. 2, a plurality of lens layers are expressed by $\Gamma(\xi)$ including $\Gamma(0)$-$\Gamma(L)$ corresponding to all points on a 3-D focal curve that is expressed by $X(\xi)$ including $X(0)$-$X(L)$ exist in an aperture of a lens.

When the RCR is set, a phase function of a lens may be calculated. The knowledge about the phase function of a lens may be sufficiently obtained from a lens structure using a general well-known method. However, although the conventional method may provide a precise analytic solution to the geometric arrangement of a more complicated RCR and an optical system having a better performance, the conventional method has a defect of being capable of analyzing only a part of the RCR.

In the optical system 100 according to the example embodiment, the phase function of the EDOF lens 120 may be obtained using the lens layers and the focal curve. The optical system 100 according to the example embodiment has symmetricity and may be realized by approximating the optical characteristics, for example, a phase function, of an actual EDOF lens.

The EDOF lens 120 according to the example embodiment is assumed as an axi-symmetric optical element having the following characteristics:

1) An aperture has a particular shape, for example, a circle or a square, and dimensions.

2) A focal curve is a line having particular position and length on an optical axis of an optical system.

3) The intensity of a light field is determined according to the focal curve.

4) The phase of light is merely delayed, but the intensity of light is not changed.

Figure 3:
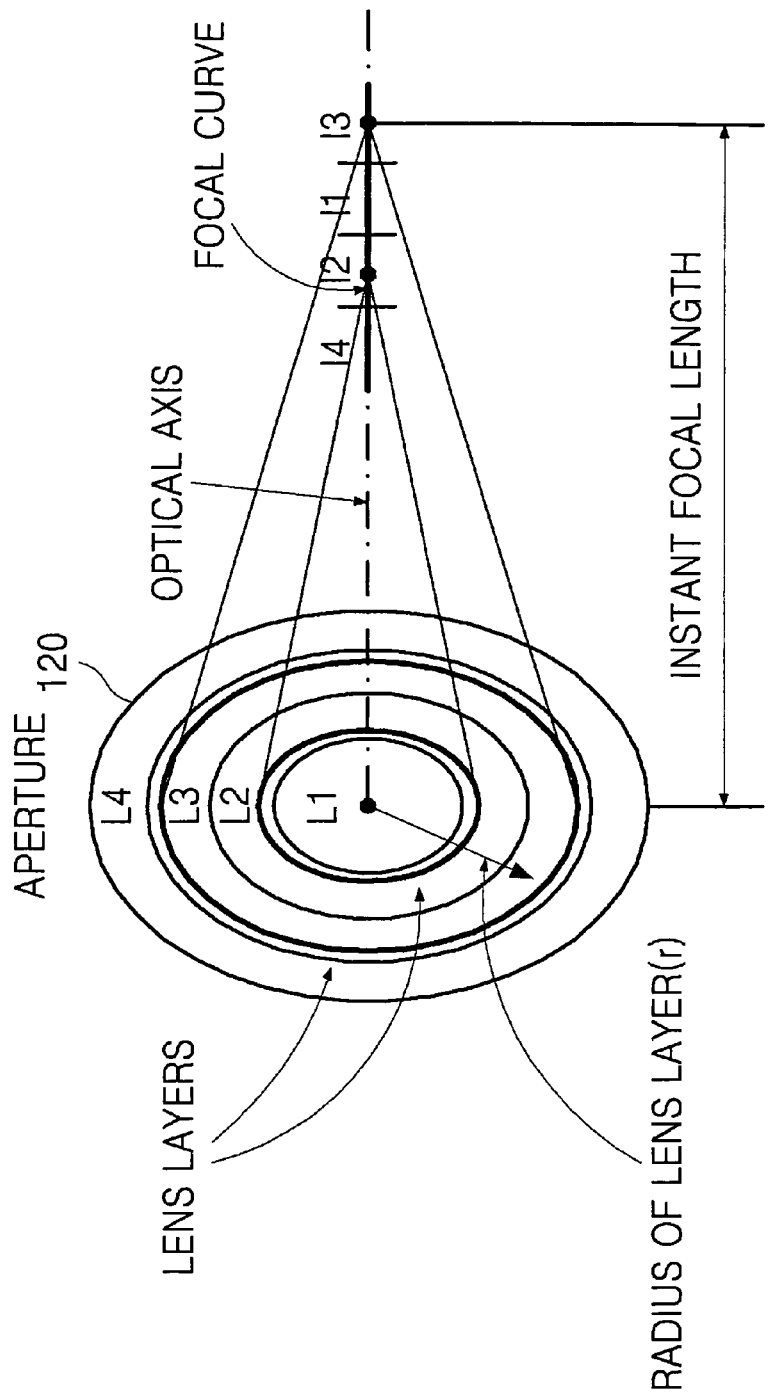

FIG. 3 is a conceptual view for explaining the ray correspondence rule of the EDOF lens 120 of FIG. 1. Referring to FIG. 3, the aperture of the EDOF lens 120 may be divided into a plurality of lens layers L1-L4, each having the center at an optical axis. In FIG. 3, four lens layers L1-L4 are illustrated for convenience of explanation, but example embodiments are is not limited thereto. The areas of the lens layers L1-L4 do not need to be constant and may be different from one another. The order of the lens layers L1-L4 may be given from a lens layer located at the center of the EDOF lens 120.

Each of the lens layers L1-L4, that is, a set of points on the aperture of a lens focusing light on the same point of a focal curve, is defined as a set of all points having the same distance from the optical axis and belonging to the aperture of the EDOF lens 120. Thus, the shape of each of lens layer L1-L4 is a circle having a radius r that is the same distance from the optical axis.

The focal curve may be divided into a plurality of sections I1-I4 that are vertical lines having particular sizes and positions. The sections I1-I4 may be overlapped with each other and do not need to have the same length. Although only four sections I1-I4 are illustrated in FIG. 3 for convenience of explanation, example embodiments are not limited thereto.

The number of the sections I1-I4 may be given from a central interval in an interleaving method. For example, when a central section is a first section I1, the left section of the first section I1 is a second section I2 and the right section of the first section I1 is a third section I3. The left section of the second section I2 is a fourth section I4 and the right section of the third section I3 may be a fifth section (not shown). This numbering continues until numbers are given to all sections.

FIG. 3 is a conceptual view for explaining the ray correspondence rule of the EDOF lens 120 of FIG. 1. The shape of the aperture area and the section division of the focal curve of the EDOF lens 120 of FIG. 3 are according to a method for designing the EDOF lens 120 and the scope of example embodiments are not limited thereto.

Each of the lens layers L1-L4 of the EDOF lens 120 can focus light within a corresponding section of the sections I1-I4 of the focal curve. For example, the first lens layer L1 focuses light in the first section I1 and the second lens layer L2 focuses light in the second section I2.

Figure 4:
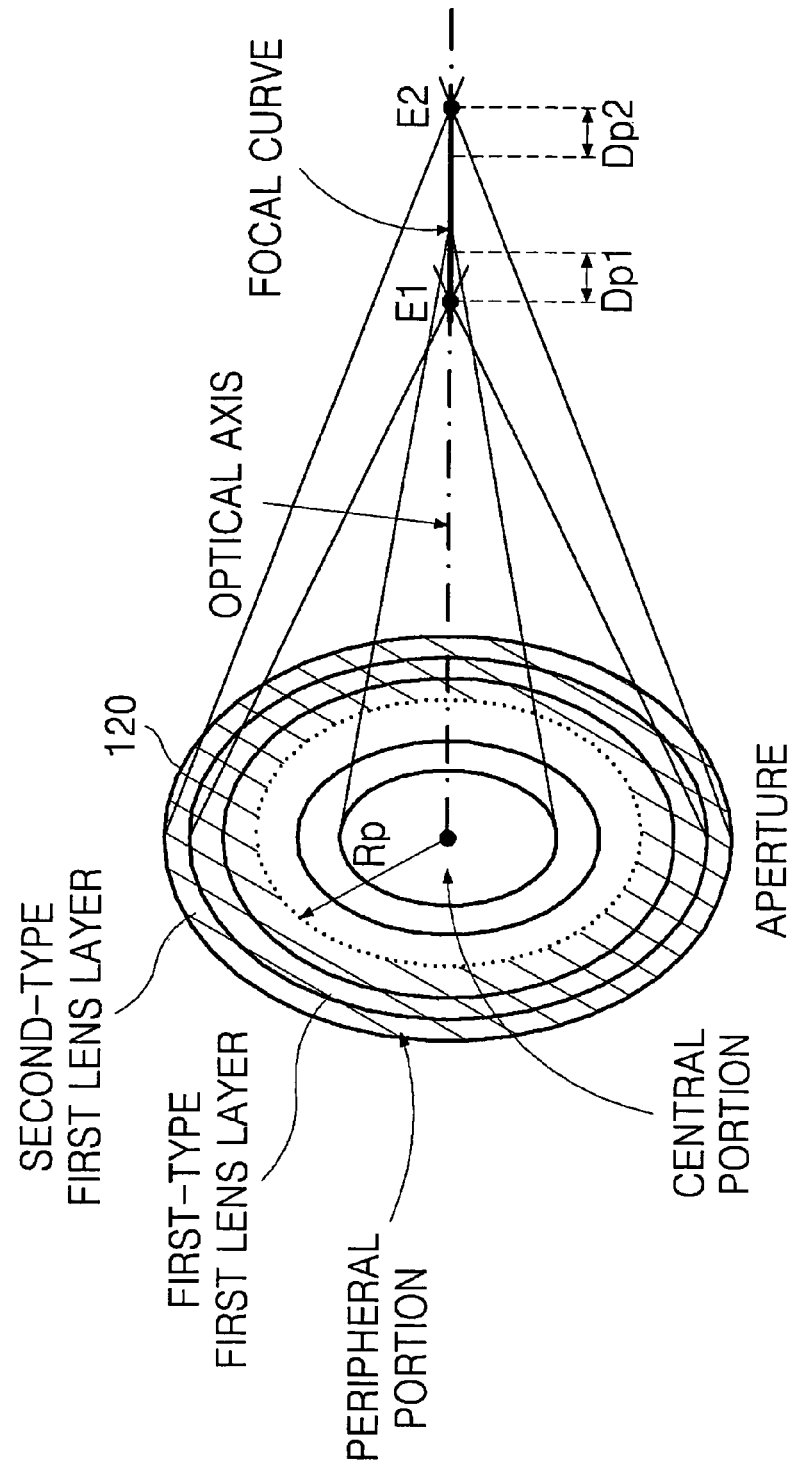

FIG. 4 is a conceptual view for explaining the focusing operation of the EDOF lens 120 of FIG. 1. Referring to FIG. 4, the peripheral portion (a hatched portion) of the EDOF lens 120 may focus light at a point E1 that is an end of the focal curve close to the EDOF lens 120 and a point E2 that is an end of the focal curve far from the EDOF lens 120. The central portion of the EDOF lens 120 may focus light in a section between the points E1 and E2. The focusing mechanism is an RCR setting process of the EDOF lens 120, which is described below in detail.

The lens layers of the EDOF lens 120 may be divided into a plurality of first layers (the hatched portion) located outside a radius Rp from the optical axis and a plurality of second layers located within the radius Rp. The first lens layers may focus light in a section from each of both ends E1 and E2 of the focal curve to a focal distance Dp1 and Dp2.

The first lens layers may be divided into at least one first-type first lens layer and at least one second-type first lens layer. For example, the first lens layer may be divided into a first-type first lens layer and a second-type first lens layer in an interleaving method.

The at least one first-type first lens layer may focus light in a section from any one (E2) of the points E1 and E2 at both ends of the focal curve to the focal distance Dp2. The at least one second-type first lens layer may focus light in a section from the other one (E1) of the points E1 and E2 at both ends of the focal curve to the focal distance Dp1. The focal distances Dp1 and Dp2 corresponding to the points E1 and E2 at both ends of the focal curve may be set different from each other.

The second lens layers may be divided into at least one first-type second lens layer and at least one second-type second lens layer. The at least one first-type second lens layer may generate a light field that is coherently mixed with the light field formed by the at least one first-type first lens layer in the section from any one (E2) of the points E1 and E2 at both ends of the focal curve to the focal distance Dp2.

The at least one second-type second lens layer may generate a light field that is coherently mixed with the light field formed by the at least one second-type first lens layer in the section from the other one (E1) of the points E1 and E2 at both ends of the focal curve to the focal distance Dp1.

However, the RCR may need some corrections due to the interference of light, a limit in the lens manufacturing and optimizing process, or the distribution of intensity of a particular light according to the focal curve. The RCR correction may generate overlap of the sections of the focal curve and/or unclearness in the definition of a central section of the focal curve.

For example, an optical element having a smaller aperture has a larger DOF. Accordingly, to fit the focal point of light passing through the peripheral portion of the EDOF lens 120 to both ends of the focal curve is more problematic than to accurately fit the focal point of light passing through the central portion of the EDOF lens 120 to the center of the focal curve.

To remove the unclearness, the CRC of the EDOF lens 120 according to the example embodiment has the following characteristic. The EDOF lens 120 focuses light at both ends of the focal curve by the first lens layers (the peripheral portion) prior to the setting of a focusing range of the second lens layer (the central portion).

The focusing mechanism of the second lens layers of the EDOF lens 120 may be set to generate coherent mixing with respect to the light field formed by the first lens layers of the EDOF lens 120. That is, according to the focusing mechanism of the EDOF lens 120, the light field formed by the second lens layers may increase the intensity of the light field formed by the first lens layers.

The second lens layers may focus light in any section of the focal curve to perform the coherent mixing focusing operation with the first lens layers. In the RCR setting process, the sections of the focal curve corresponding to the lens layers may be overlapped with one another. Also, the distribution of the intensity of the light field of any one of the sections of the focal curve may be controlled by the thickness of each of the at least corresponding one of the lens layers.

Figure 5:
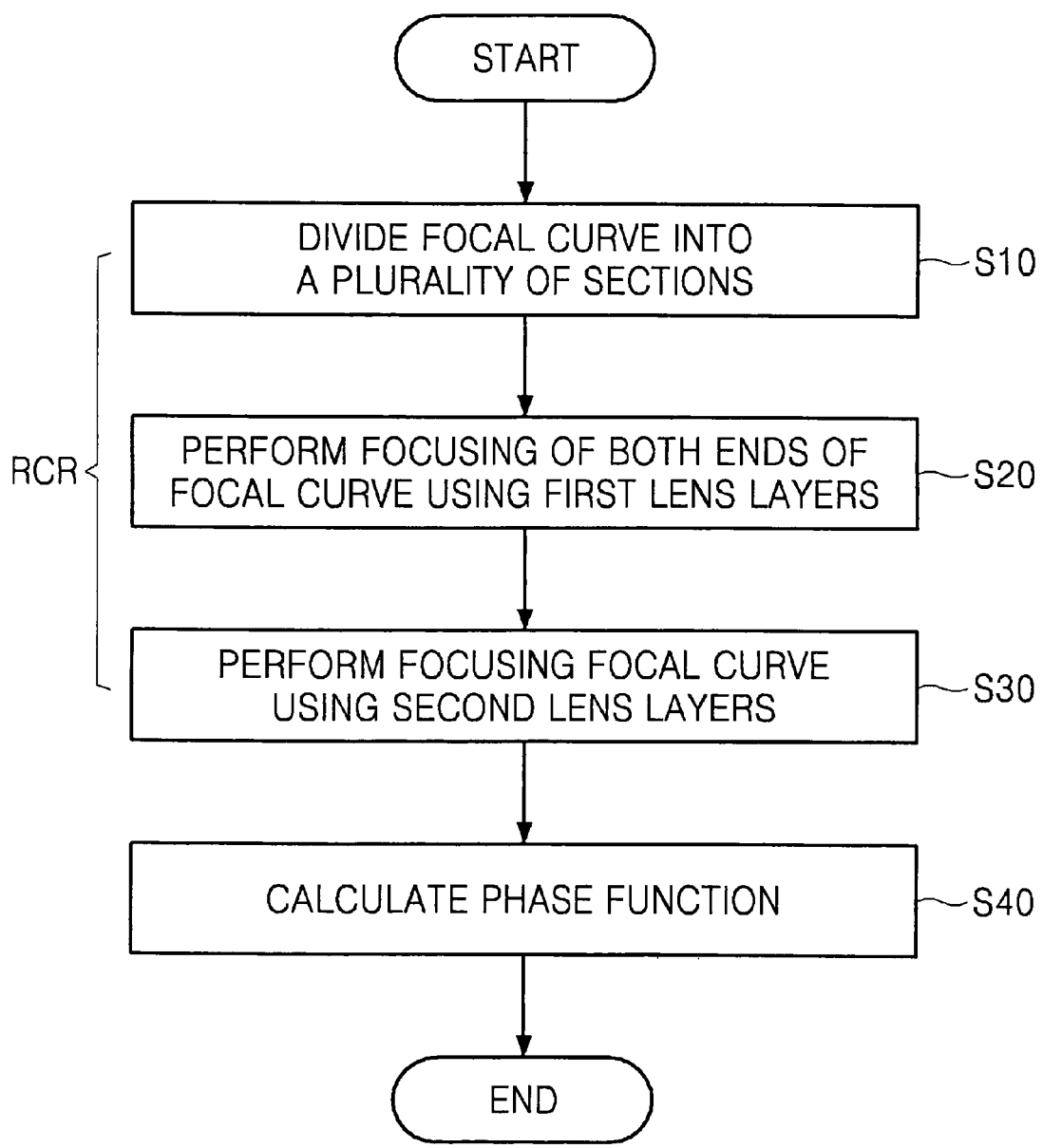

FIG. 5 is a flowchart for explaining the design process of the EDOF lens 120, according to an example embodiment. Referring to FIGS. 3-5, in the design process of the EDOF lens 120 according to the example embodiment, first, the focal curve of the EDOF lens 120 may be divided into the section I1-14 (S10). When the focal curve of the EDOF lens 120 is divided into the section I1-I4, the first lens layers of the EDOF 120 perform focusing at both ends of the focal curve (S20).

When the focusing of both ends of the focal curve is performed, the second lens layers of the EDOF lens 120 performs focusing of the focal curve (S30). As described above, the focusing operation of the second lens layers generates the coherent mixing with the first lens layers. The operations S10-S30 relate to the RCR setting process of the EDOF lens 120.

When the RCR of the EDOF lens 120 is set, the phase function of the EDOF lens 120 is calculated (S40). The phase function of the EDOF lens 120 may be defined by being approximated to the instant focal length of the EDOF lens 120.

Mathematic Expression 1 below may indicate the instant focal length of the EDOF lens 120.

$$F(r) = \begin{cases} F_1(r_1), & \text{for the first lens layer} \\ F_2(r_2), & \text{for the second lens layer} \end{cases} \quad \text{[Mathematical Expression 1]}$$

Here, "F(r)" denotes the instant focal length of the lens layer having a radius r, "r1" denotes the radius of the first lens layer, and "r2" denotes the radius of the second lens layer. Referring to Mathematical Expression 1, the instant focal length of the EDOF lens 120 may be determined by the radius of the lens layer.

The phase function of the EDOF lens 120 may be defined based on the optical phase delay of the EDOF lens 120. Mathematical Expression 2 may indicate the optical phase delay of the EDOF lens 120.

$$\Phi(r) = \frac{\pi \times r^2}{\lambda \times F(r)} \quad \text{[Mathematical Expression 2]}$$

Here, "Φ(r)" denotes the optical phase delay of an optical element used for the optical element design, "r" denotes the radius of the lens layer, "λ" denotes the wavelength of the light, and "F(r)" denotes the function of the instant focal length with respect to the radius of the lens layer.

The phase function of the EDOF lens 120 may be easily obtained from the relationship between the instant focal length of the EDOF lens 120 (Mathematical Expression 1) and the optical phase delay of the EDOF lens 120 (Mathematical Expression 2).

Figure 6:
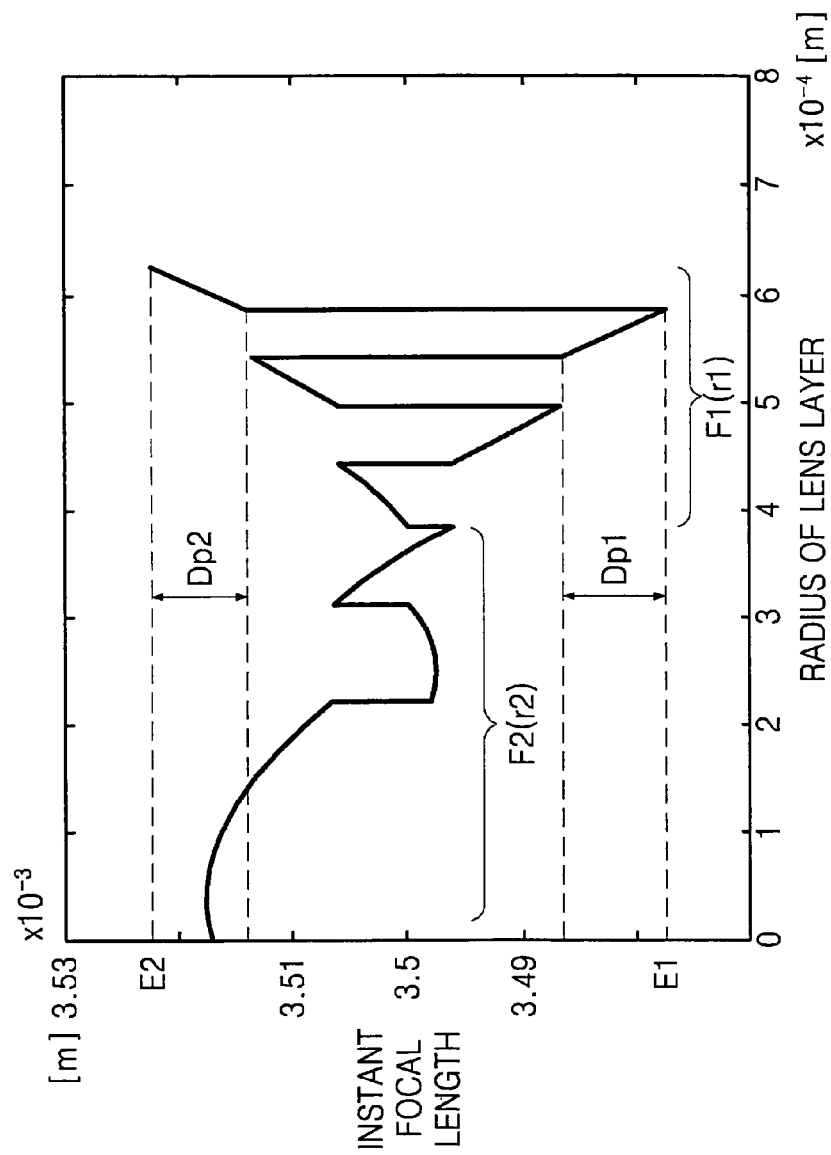

FIG. 6 is a graph showing a simulation result of an instant focal distance of the EDOF lens 120 with respect to the lens layer, according to an example embodiment. The simulation conditions are as follows. The EDOF lens 120 is optimized for fitting the focus of a parallel beam of light to a focal curve from 3.48 mm to 3.52 mm with a constant intensity distribution. The EDOF lens 120 has an aperture having a diameter of 1.25 mm. The aperture is divided into eight lens layers.

Referring to FIG. 6, "F1(r1)" and "F2(r2)" may be smooth and continuous in each section, but discontinuous at a boundary between the sections. Also, the light is focused at both ends of the focal curve (the section from the focal length E1 to Dp1 and the section from the focal length E2 to Dp2) by the first lens layers of the EDOF lens 120.

The EDOF lens 120 according to the example embodiment may be used for an aspherical lens having a circular discontinuity at a boundary portion between lens layers, a diffraction optical element (DOE), and a correction element used with a general optical element, but the scope of example embodiments are not limited thereto.

As described above, according to the EDOF lens and an optical system having the EDOF lens according to the example embodiments, because a clear image regardless of a distance from an object can be generated, symmetry, simplification of point spread function, continuity of a lens surface, and easiness in designing, which are improved to those of the general lens, may be provided.

While example embodiments have been particularly shown and described, it will be understood by one of ordinary skill in the art that variations in form and detail may be made therein without departing from the spirit and scope of the claims.

What is claimed is:

1. An optical system comprising:
a lens including a plurality of lens layers, each lens layer being axi-symmetric and having an extended depth of focus to focus light in a corresponding section of a plurality of sections of a focal curve in a form of a straight line located on an optical axis, the plurality of lens layers include a plurality of first lens layers, wherein
at least one of the first lens layers is configured to focus light in a section from any one of both ends of the focal curve to a first focal distance, and
at least one of the first lens layers is configured to focus light in a section from the other one of both ends of the focal curve to a second focal distance;
an image sensor configured to detect an image formed by the lens having an extended depth of focus; and
an image processor configured to restore an image detected by the image sensor.

2. The optical system of claim 1, wherein the plurality of lens layers include a plurality of first lens layers located outside a radius from the optical axis, and the plurality of first lens layers focus light in a section from each of both ends of the focal curve to at least one focal distance.

3. The optical system of claim 2, wherein the plurality of lens layers further include a plurality of second lens layers located within the radius from the optical axis, and a light field formed by a corresponding one of the plurality of second lens layers is coherently mixed with a light field formed by the first lens layers.

4. The optical system of claim 3, wherein a thickness of each of the corresponding at least one lens layer of the plurality of lens layers controls a distribution of intensity of a light field of any one of the plurality of sections of the focal curve.

5. The optical system of claim 3, wherein the lens layers have instant focal lengths with respect to radii of the plurality of lens layers that define a phase function of the lens having an extended depth of focus.

6. The optical system of claim 5, wherein the instant focal length defines the phase function of the lens having an extended depth of focus corresponding to the following mathematical expression, $$F(r) = \begin{cases} F_1(r_1), & \text{for the first lens layer} \\ F_2(r_2), & \text{for the second lens layer,} \end{cases}$$

where F(r) denotes the instant focal length of a lens layer having a radius r,
r1 denotes the radius of the first lens layer, and
r2 denotes the radius of the second lens layer.

7. The optical system of claim 3, wherein the lens layers have optical phase delays with respect to radii of the plurality of lens layers that define the phase function of the lens having an extended depth of focus.

8. The optical system of claim 7, wherein the optical phase delay define the phase function of the lens having an extended depth of focus corresponding to the following mathematical expression, $$\Phi(r) = \frac{\pi \times r^2}{\lambda \times F(r)},$$

where $\Phi(r)$ denotes an optical phase delay,
r denotes the radius of a lens layer,
$\lambda$ denotes the wavelength of light, and
F(r) denotes the instant focal length of the lens layer.

9. The optical system of claim 1, wherein the plurality of first lens layers are located outside a radius from the optical axis.

10. The optical system of claim 9, wherein the plurality of lens layers further include a plurality of second lens layers located within the radius from the optical axis, and the plurality of second lens layers include,
at least one first-type second lens layer that forms a light field to be coherently mixed with the light field formed by the at least one first lens layer that is configured to focus light in a section from any one of both ends of the focal curve to a first focal distance; and
at least one second-type second lens layer that forms a light field to be coherently mixed with the light field formed by the at least one first lens layer that is configured to focus light in a section from the other one of both ends of the focal curve to a second focal distance.

11. A lens having an extended depth of focus, the lens comprising:
a plurality of first lens layers located outside a radius from an optical axis, wherein
at least one of the first lens layers is configured to focus light in a section from any one of both ends of the focal curve to a first focal distance, and
at least one of the first lens layers is configured to focus light in a section from the other one of both ends of the focal curve to a second focal distance; and
a plurality of second lens layers located within the radius from the optical axis, wherein the plurality of first lens layers focus light in a section from each of both ends of a focal curve in a form of a straight line located on the optical axis to at least one focal distance.

12. The lens of claim 11, wherein a corresponding lens of the plurality of second lens layers forms a light field and is coherently mixed with a light field formed by the first lens layers.

13. The lens of claim 12, wherein a thickness of each of the corresponding at least one lens layer of the plurality of lens layers controls a distribution of intensity of a light field of any one of the plurality of sections of the focal curve.

14. The lens of claim 12, wherein the lens layers have instant focal lengths with respect to radii of the plurality of lens layers that define a phase function of the lens having an extended depth of focus.

15. The lens of claim 14, wherein the instant focal length defines the phase function of the lens having an extended depth of focus corresponding to the following mathematical expression, $$F(r) = \begin{cases} F_1(r_1), & \text{for the first lens layer} \\ F_2(r_2), & \text{for the second lens layer,} \end{cases}$$

where F(r) denotes the instant focal length of a lens layer having a radius r,
r1 denotes the radius of the first lens layer, and
r2 denotes the radius of the second lens layer.

16. The lens of claim 12, wherein the lens layers have optical phase delays with respect to radii of the plurality of lens layers that define the phase function of the lens having an extended depth of focus.

17. The lens of claim 16, wherein the optical phase delay defines the phase function of the lens having an extended depth of focus corresponding to the following mathematical expression, $$\Phi(r) = \frac{\pi \times r^2}{\lambda \times F(r)},$$

where $\Phi(Kr)$ denotes an optical phase delay,
r denotes the radius of a lens layer,
λ denotes the wavelength of light, and
F(r) denotes the instant focal length of the lens layer.

18. The lens of claim 11, wherein the plurality of second lens layers include,
 at least one first-type second lens layer that forms a light field to be coherently mixed with the light field formed by the at least one first lens layer that is configured to focus light in a section from any one of both ends of the focal curve to a first focal distance, and
 at least one second-type second lens layer that forms a light field to be coherently mixed with the light field formed by the at least one first lens layer that is configured to focus light in a section from the other one of both ends of the focal curve to a second focal distance.

19. A method for designing an extended depth of focus lens, the method comprising:
 dividing the focal curve of the lens into a plurality of sections;
 focusing both ends of the focal curve using one or more first lens layers located outside a radius from an optical axis, wherein
  at least one of the first lens layers is configured to focus light in a section from any one of both ends of the focal curve to a first focal distance, and
  at least one of the first lens layers is configured to focus light in a section from the other one of both ends of the focal curve to a second focal distance;
 focusing the focal curve using one or more second lens layers located within the radius from the optical axis, wherein
  the plurality of first lens layers focus light in a section from each of both ends of a focal curve in the form of a straight line located on the optical axis to a focal distance, and
  the focusing of the one or more second lens layers generates a coherent mixing with the one or more first lens layers;
 calculating the lens phase function; and
 manufacturing the lens.

20. The method of claim 19, wherein the phase function is defined by an instant focal length corresponding to the following mathematical expression, $$F(r) = \begin{cases} F_1(r_1), & \text{for the first lens layer} \\ F_2(r_2), & \text{for the second lens layer,} \end{cases}$$

where F(r) denotes the instant focal length of a lens layer having a radius r,
r1 denotes the radius of the first lens layer, and
r2 denotes the radius of the second lens layer.

21. The lens of claim 19, wherein the phase function of the lens is defined by an optical phase delay corresponding to the following mathematical expression, $$\Phi(r) = \frac{\pi \times r^2}{\lambda \times F(r)},$$

where $\Phi(r)$ denotes an optical phase delay,
r denotes the radius of a lens layer,
λ denotes the wavelength of light, and
F(r) denotes the instant focal length of the lens layer.

\* \* \* \* \*